US012667801B2

(12) United States Patent
Yun et al.

(10) Patent No.: US 12,667,801 B2
(45) Date of Patent: Jun. 30, 2026

(54) ANTIBACTERIAL FILTER, METHOD FOR MANUFACTURING SAME, AND AIR PURIFIER COMPRISING SAME

(71) Applicant: COWAY Co., Ltd., Gongju-si (KR)

(72) Inventors: Hyun Jun Yun, Seoul (KR); Hyun Kyu Lee, Seoul (KR); Hu Min Lee, Seoul (KR); Jong Cheol Kim, Seoul (KR); Byong Hyoek Lee, Seoul (KR); Kyung Hwan Lee, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 328 days.

(21) Appl. No.: 18/553,865

(22) PCT Filed: Feb. 17, 2022

(86) PCT No.: PCT/KR2022/002375
§ 371 (c)(1),
(2) Date: Oct. 4, 2023

(87) PCT Pub. No.: WO2022/225159
PCT Pub. Date: Oct. 27, 2022

(65) Prior Publication Data
US 2024/0189747 A1 Jun. 13, 2024

(30) Foreign Application Priority Data

Apr. 21, 2021 (KR) ........................ 10-2021-0051790

(51) Int. Cl.
B01D 53/02 (2006.01)
B01D 39/16 (2006.01)
(Continued)
(52) U.S. Cl.
CPC ..... B01D 39/1623 (2013.01); B01D 39/2031 (2013.01); B01D 46/0028 (2013.01);
(Continued)

(58) Field of Classification Search
CPC .... B01D 2239/0442; B01D 2239/0492; B01D 2239/10; B01D 39/16; B01D 39/1623;
(Continued)

(56) References Cited

U.S. PATENT DOCUMENTS 6,296,863 B1 * 10/2001 Trogolo ................ D06M 16/00
424/404
2005/0121387 A1 * 6/2005 Kuennen ................. C02F 1/283
210/506

(Continued)

FOREIGN PATENT DOCUMENTS

JP 2013-49944 A 3/2013
KR 10-2010-0032659 A 3/2010
(Continued)

OTHER PUBLICATIONS

Translation of JP2013-49944 A (Year: 2013).*
International Search Report and Written Opinion issued May 31, 2022 in PCT/KR2022/002375 filed on Feb. 17, 2022.

*Primary Examiner* — Christopher P Jones
(74) *Attorney, Agent, or Firm* — Oblon, McClelland, Maier & Neustadt, L.L.P.

(57) ABSTRACT

An antibacterial filter, a method for manufacturing the filter, and an air purifier comprising the filter. The antibacterial filter contains a specific range of active copper particles bound to the surface of fibers, and thus can effectively prevent microorganisms, such as bacteria, fungi, and viruses, harmful to the human body, from proliferating on or contaminating the filter surface, and further improve antibacterial performance and sustained antibacterial performance. Additionally, when the antimicrobial filter is applied to an air purifier, it is possible to supply purified air and, at the same time, further improve the durability and lifetime characteristics of the filter.

12 Claims, 5 Drawing Sheets

(51) Int. Cl.
    *B01D 39/20*     (2006.01)
    *B01D 46/00*     (2022.01)
    *C08J 3/22*     (2006.01)
    *D01D 5/08*     (2006.01)
    *D01F 1/10*     (2006.01)

(52) U.S. Cl.
    CPC .................. *C08J 3/22* (2013.01); *D01D 5/08* (2013.01); *D01F 1/103* (2013.01); *B01D 2239/0442* (2013.01); *B01D 2239/0492* (2013.01); *B01D 2239/10* (2013.01)

(58) Field of Classification Search
    CPC .... B01D 39/20; B01D 39/2031; B01D 46/00; B01D 46/0028; C08J 3/22; C23C 16/513; D01D 5/08; D01F 1/10; D01F 1/103; D01F 6/06
    See application file for complete search history.

(56)           References Cited

U.S. PATENT DOCUMENTS

| | | | |
|---|---|---|---|
| 2011/0151255 A1 | 6/2011 | Kim et al. | |
| 2019/0168145 A1* | 6/2019 | Wang ................... | B01J 20/0233 |
| 2021/0274778 A1* | 9/2021 | Gopal ................ | A41D 13/1192 |

FOREIGN PATENT DOCUMENTS

| | | |
|---|---|---|
| KR | 10-2011-0072805 A | 6/2011 |
| KR | 10-2017-0028854 A | 3/2017 |
| KR | 10-2020-0098256 A | 8/2020 |
| KR | 10-2232002 B1 | 3/2021 |

* cited by examiner

S100A

Depositing copper nanoparticles on the surface of a support to obtain antimicrobial particles ~ S109

Mixing and extruding the antimicrobial particles and a first polymer resin to obtain a first masterbatch ~ S110

Mixing the first masterbatch with second polymer resin pellets to obtain a mixture ~ S120

Melt-spinning the mixture ~ S130

Antimicrobial filter

Fig. 3

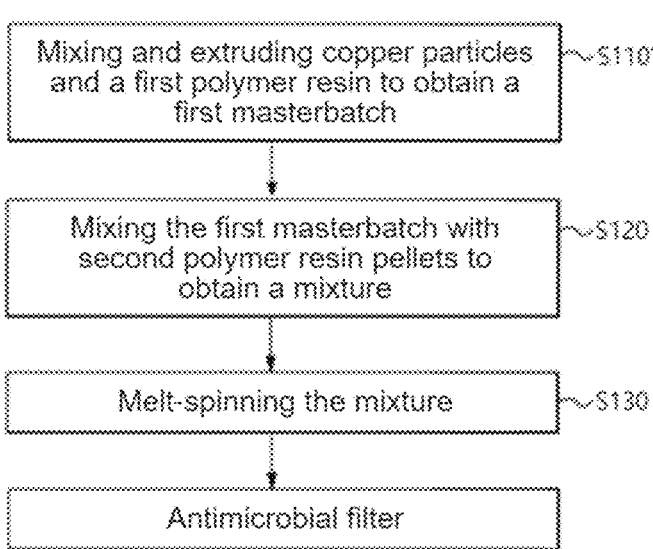

S100B

Mixing and extruding copper particles and a first polymer resin to obtain a first masterbatch  ~S110'

Mixing the first masterbatch with second polymer resin pellets to obtain a mixture  ~S120

Melt-spinning the mixture  ~S130

Antimicrobial filter

Fig. 4

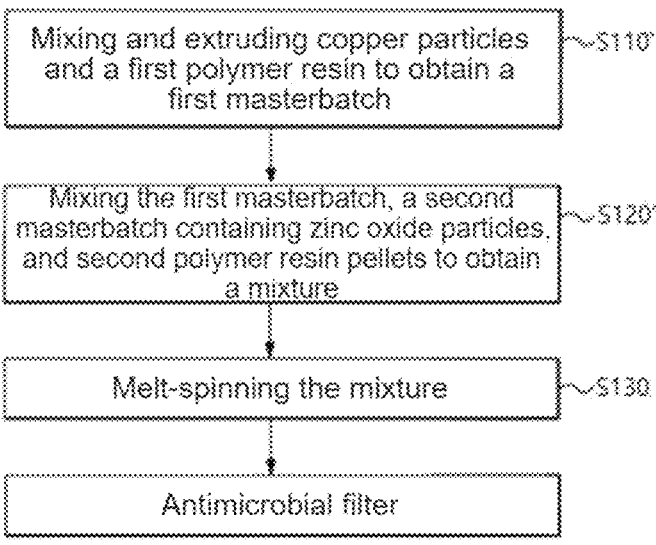

S100C

Mixing and extruding copper particles and a first polymer resin to obtain a first masterbatch  ~S110'

Mixing the first masterbatch, a second masterbatch containing zinc oxide particles, and second polymer resin pellets to obtain a mixture  ~S120'

Melt-spinning the mixture  ~S130

Antimicrobial filter

ANTIBACTERIAL FILTER, METHOD FOR MANUFACTURING SAME, AND AIR PURIFIER COMPRISING SAME

CROSS-REFERENCE TO RELATED APPLICATIONS

The present application is a 35 U.S.C. § 371 National Stage Application of International Patent Application PCT/KR2022/002375, filed Feb. 17, 2022, which is based on and claims the benefit of priority to Korean Application No. 10-2021-0051790, filed Apr. 21, 2021. The entire contents of these applications are incorporated herein by reference.

TECHNICAL FIELD

The present invention relates to an antimicrobial filter, to a process for preparing the same, and to an air purifier comprising the same.

BACKGROUND ART

As air pollution problems such as fine dust and yellow dust have become serious in recent years, air purification that filters indoor air has become both desirable and essential. An air purifying device such as an air purifier is capable of supplying fresh air by filtering out contaminated dust or substances harmful to the human body in the air by using various filter systems.

In general, contaminants such as dust can be filtered by an air filter that primarily removes dust whereas microorganisms harmful to the human body such as mites, bacteria, mold, viruses, and the like are hardly filtered by a conventional air filter since they have a size of microns or less. Although a filter having micropores capable of filtering microorganisms having a size of microns or less may be additionally adopted, such a micropore filter has a problem in that filtered microorganisms proliferate on the surface of the filter, which may be reintroduced into the room or generate unpleasant odors.

To solve this problem, antimicrobial particles such as nano-sized zinc oxide particles or copper particles have been used. However, most of these nano-sized antimicrobial particles are buried inside the fibers, and the antimicrobial performance is lowered since there are little or no active copper particles on the fiber surface, or their content is low.

Therefore, there is a need for the development of an antimicrobial filter that solves the above problem, is capable of effectively filtering dust or microorganisms, is excellent in antimicrobial properties, thereby effectively preventing microorganisms harmful to the human body such as bacteria, mold, viruses, and the like from proliferating on the surface of the filter, and is excellent in properties such as filter damage prevention effect, durability, and persistence of antimicrobial properties.

PRIOR ART DOCUMENT

Patent Document (Patent Document 1) Korean Laid-open Patent Publication No. 2010-0032659

DISCLOSURE OF INVENTION

Technical Problem

The present invention is devised to solve the problems of the prior art discussed above.

An object of the present invention is to provide an antimicrobial filter that has excellent antimicrobial performance and antimicrobial persistence performance.

Another object of the present invention is to provide a process for preparing the antimicrobial filter.

Another object of the present invention is to provide an air purifier comprising the antimicrobial filter.

Solution to Problem

The present invention provides an antimicrobial filter, which comprises a fiber formed from a polymer resin and antimicrobial particles, wherein the antimicrobial particles comprise copper particles or copper particles deposited on a support, the copper particles comprise active copper particles bound to the surface of the fiber and inactive copper particles partially or entirely embedded in the fiber, and the content ratio ($Cu_{AR}$) of the active copper particles represented by the following Equation 1 is 5 to 20%:

$$Cu_{AR}(\%) = \frac{Cu_A}{Cu_T} \times 100 \qquad \text{[Equation 1]}$$

In Equation 1, $Cu_T$ and $Cu_A$ are each the content (ppm) of copper particles measured using an inductively coupled plasma (ICP) analyzer, wherein $Cu_T$ is the content of total copper particles contained in an antimicrobial filter measured by putting 0.1 g of the antimicrobial filter in a mixed solution of $HNO_3$ and $H_2O_2$ and pre-treating it with a microwave at 2,450 MHz at 200° C. for 20 minutes, and $Cu_A$ is the content of active copper particles measured by putting 0.1 g of the antimicrobial filter in an $HNO_3$ solution and treating it with acid at 25° C. for 720 minutes.

In addition, the present invention provides a process for preparing an antimicrobial filter, which comprises a first step of mixing and extruding antimicrobial particles and a first polymer resin to obtain a first masterbatch, a second step of mixing the first masterbatch with second polymer resin pellets to obtain a mixture; and a third step of melt-spinning the mixture, wherein the antimicrobial filter comprises a fiber formed from a polymer resin and antimicrobial particles, the antimicrobial particles comprise copper particles or copper particles deposited on a support, the copper particles comprise active copper particles bound to the surface of the fiber and inactive copper particles partially or entirely embedded in the fiber, and the content ratio ($Cu_{AR}$) of the active copper particles represented by the above Equation 1 is 5 to 20%.

Further, the present invention provides an air purifier comprising the antimicrobial filter.

Advantageous Effects of Invention

The antimicrobial filter according to an embodiment of the present invention comprises active copper particles bound to the surface of a fiber and inactive copper particles partially or entirely embedded in the fiber, and the content ratio of the active copper particles satisfies a specific range; thus, it can effectively prevent microorganisms harmful to the human body, such as bacteria, mold, and viruses, from proliferating on, or contaminating, the filter surface, without changing the dust collection performance and pressure loss, thereby further enhancing antimicrobial performance and antimicrobial persistence performance.

Further, when the antimicrobial filter is applied to an air purifier, it is possible to further enhance the durability and lifespan characteristics of the filter while supplying purified air.

BRIEF DESCRIPTION OF DRAWING

FIG. 3 is a flowchart illustrating a process for preparing an antimicrobial filter according to another embodiment of the present invention.

FIG. 4 is a flowchart illustrating a process for preparing an antimicrobial filter according to another embodiment of the present invention.

BEST MODE FOR CARRYING OUT THE INVENTION

Figure 1:
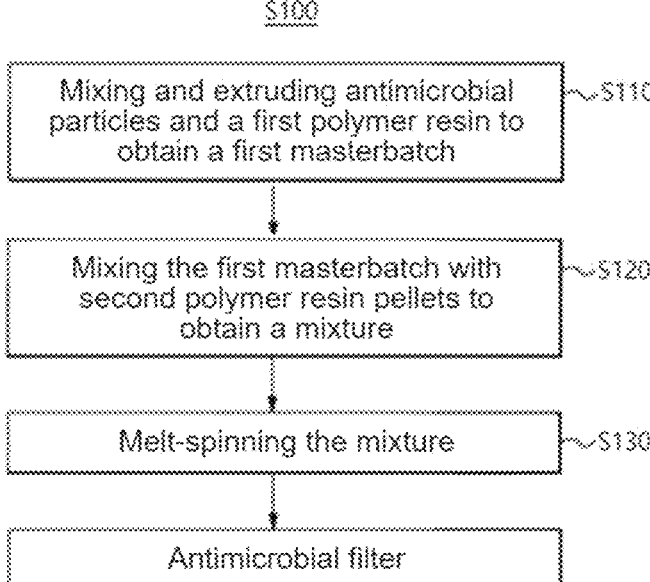
FIG. 1 is a flowchart illustrating a process for preparing an antimicrobial filter according to an embodiment of the present invention.

Hereinafter, the present invention will be described in more detail.

The present invention is not limited to the disclosures given below, but it may be modified into various forms as long as the gist of the invention is not changed.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about" unless otherwise indicated.

Throughout the present specification, the terms first, second, third, and the like are used to describe various components. But the components should not be limited by the terms. The terms are used only for the purpose of distinguishing one component from another.

In addition, some components are exaggerated, omitted, or schematically illustrated in the accompanying drawings, and the size of each component does not entirely reflect the actual size.

The terms used in this specification are only used to describe specific embodiments and are not intended to limit the present invention. Singular expressions encompass plural expressions unless the context clearly indicates otherwise.

In the present specification, the same reference numeral refers to the same element.

Hereinafter, the antimicrobial filter according to an embodiment of the present invention will be described.
Antimicrobial Filter The antimicrobial filter according to an embodiment of the present invention comprises a fiber formed from a polymer resin and antimicrobial particles, wherein the antimicrobial particles comprise copper particles or copper particles deposited on a support, the copper particles comprise active copper particles bound to the surface of the fiber and inactive copper particles partially or entirely embedded in the fiber, and the content ratio ($Cu_{AR}$) of the active copper particles represented by the following Equation 1 is 5 to 20%:

$$Cu_{AR}(\%) = \frac{Cu_A}{Cu_T} \times 100 \qquad \text{[Equation 1]}$$

In Equation 1, $Cu_T$ and $Cu_A$ are each the content (ppm) of copper particles measured using an inductively coupled plasma (ICP) analyzer, wherein $Cu_T$ is the content of total copper particles contained in an antimicrobial filter measured by putting 0.1 g of the antimicrobial filter in a mixed solution of $HNO_3$ and $H_2O_2$ and pre-treating it with a microwave at 2,450 MHz at 200° C. for 20 minutes, and $Cu_A$ is the content of active copper particles measured by putting 0.1 g of the antimicrobial filter in an $HNO_3$ solution and treating it with acid at 25° C. for 720 minutes.

In the present specification, the term "antimicrobial" refers to a function of suppressing the growth of microorganisms harmful to the human body, such as mites, bacteria, mold, viruses, and the like, or destroying and killing the microorganisms.

Thus, when the antimicrobial filter is applied to an air purifier, it is possible to prevent contamination of the filter from airborne microorganisms while supplying purified air, thereby further enhancing the durability and lifespan characteristics of the filter The antimicrobial filter according to an embodiment of the present invention comprises antimicrobial particles, and the antimicrobial particles comprise copper particles or copper particles deposited on a support.

Copper is known to sterilize and remove viruses, mold, or bacteria, as well as algae, moss, spores, and protozoa. In particular, copper can kill 99.9% or more of viruses, molds, or bacteria, such as E. coli, through contact sterilization; thus, it has an advantage in providing an antimicrobial effect.

Specifically, in the copper particles, copper ions may react with oxygen to form hydrogen peroxide and react with hydrogen peroxide again to form highly reactive hydroxyl radicals. The hydroxyl radical may exhibit an antimicrobial effect by interfering with physiological metabolism by inducing the destruction or change of lipids, proteins, and nucleic acid components of bacterial cells. That is, when copper ions encounter viruses, mold, or bacteria, they can destroy their cell membranes and protein shells and kill them, imparting an antimicrobial effect.

Meanwhile, the copper particles contained in the antimicrobial filter may be bound to the surface of a fiber, partially or entirely embedded in the fiber, or contained in both of them.

In the present specification, the copper particles bound to the surface of a fiber are defined as active copper particles, and the copper particles partially or entirely embedded in the fiber are defined as inactive copper particles.

In an embodiment of the present invention, it has been discovered that the antimicrobial level and the persistence of the antimicrobial function may vary depending on the content ratio of the active copper particles, whereby the desired effect has been achieved by adjusting the content ratio of the active copper particles to a specific range.

That is, as the antimicrobial filter according to an embodiment of the present invention satisfies the content ratio of the active copper particles represented by Equation 1 in a specific range, the active copper particles can be uniformly and evenly distributed in the antimicrobial filter with an optimal content for producing an antimicrobial effect. As a result, it is possible to effectively prevent microorganisms harmful to the human body, such as bacteria, mold, and viruses, from proliferating on the surface of the filter, whereby antimicrobial performance and antimicrobial persistence performance can be further enhanced. In addition, it is also possible to stop viruses and bacteria from propagating by the active copper particles bound to the fiber surface.

Specifically, the content ratio ($Cu_{AR}$) of the active copper particles may be 5 to 20%. Specifically, the content ratio ($Cu_{AR}$) of the active copper particles may be 7 to 18% or 10 to 17%.

The content of the total copper particles contained in the antimicrobial filter, Cur, by weight, may be, for example, 350 to 50,000 ppm, 400 to 50,000 ppm, 500 to 45,000 ppm, 530 to 40,000 ppm, 700 to 40,000 ppm, 1,000 to 40,000 ppm, or 5,000 to 40,000 ppm. $Cu_T$ may be measured by putting 0.1 g of the antimicrobial filter in a mixed solution of $HNO_3$ and $H_2O_2$ and pre-treating it with a microwave at 2,450 MHz at 200° C. for 20 minutes.

The content of the active copper particles bound to the fiber surface, $Cu_A$, by weight, may be, for example, 15 to 10,000 ppm, 17 to 10,000 ppm, 35 to 7,500 ppm, 100 to 7,000 ppm, 200 to 6,000 ppm, 500 to 6,000 ppm, 800 to 6,000 ppm, or 1,000 to 6,000 ppm. $Cu_A$ may be measured by putting 0.1 g of the antimicrobial filter in an $HNO_3$ solution and treating it with acid at 25° C. for 720 minutes. If the content of the active copper particles satisfies the above range, antimicrobial performance and antimicrobial persistence performance can be further enhanced.

Meanwhile, the antimicrobial filter may comprise total copper particles, which is the sum of the active copper particles and the inactive copper particles, in an amount of 2 to 10% by weight based on the total weight of the antimicrobial filter. Here, the antimicrobial filter refers to a filter excluding a housing. Specifically, the antimicrobial filter may comprise total copper particles in an amount of, for example, 2 to 8% by weight, for example, 2 to 6% by weight, or, for example, 2 to 5% by weight, based on the total weight of the antimicrobial filter. As the content of the total copper particles satisfies the above range, it is possible to effectively prevent microorganisms harmful to the human body, such as bacteria, mold, viruses, and the like, from proliferating on the filter surface; thus, it can have excellent antimicrobial properties and further enhance the durability and lifespan characteristics of the filter by virtue of an excellent filter damage prevention effect.

In addition, the absolute value of a deviation in $Cu_A$ may be, for example, 150 ppm or less, 140 ppm or less, 100 ppm or less, 90 ppm or less, or 50 ppm or less. When 0.1 g of an antimicrobial filter sample collected from an arbitrary part of the antimicrobial filter is put in an $HNO_3$ solution and treated with acid at 25° C.' for 720 minutes for analysis with an inductively coupled plasma (ICP) analyzer, the deviation in $Cu_A$ is expressed as an absolute value of the difference in the content ($Cu_A$) of the measured active copper particles.

If the absolute value of a deviation in $Cu_A$ is less than or equal to the above range, the active copper particles are uniformly and evenly dispersed in the antimicrobial filter, whereby the antimicrobial performance and antimicrobial persistence performance of the antimicrobial filter may be further enhanced.

Meanwhile, the antimicrobial filter may have a ratio ($AP_{DR}$ (%)) of the average particle diameter of the antimicrobial particles to the average particle diameter of the fiber of 70 to 150% as represented by the following Equation 2:

$$AP_{DR}(\%) = \frac{AP_{D50}}{F_{D50}} \times 100 \qquad \text{[Equation 2]}$$

In Equation 2, $F_{D50}$ is the average particle diameter (D50) of the fiber measured using a scanning electron microscope (SEM), and $AP_{D50}$ is the average particle diameter (D50) of the antimicrobial particles that is 50% of the cumulative volume (%) in a particle size distribution measured by the laser diffraction method.

Specifically, $AP_{DR}$ (%) may be 80 to 140%, 80 to 130%, or 85 to 120%

In Equation 2, $F_{D50}$ may be 1 to 10 μm, 2 to 8 μm, or 2 to 5 μm.

$AP_{D50}$ may be 1 to 8 μm, 1 to 7 μm, or 2 to 5 μm.

The absolute value of a deviation in the diameter of the antimicrobial particles may be 1 to 3 μm, 1 to 2.8 μm, or 1 to 2.5 μm. The deviation in the diameter of the antimicrobial particles may be, for example, a difference (D) in the particle diameter (D) of the antimicrobial particles when measured using a microparticle size analyzer (Malvern Instruments Ltd.) equipment.

The antimicrobial particles may have an SPAN value of 0.8 to 2 as represented by the following Equation 3:

$$SPAN = \frac{AP_{D90} - AP_{D10}}{AP_{D50}} \qquad \text{[Equation 3]}$$

In Equation 3, $AP_{D10}$, $AP_{D50}$, and $AP_{D90}$ are each the average particle diameter of the antimicrobial particles that is 10%, 50%, and 90% of the cumulative volume (%) in a particle size distribution measured by the laser diffraction method.

The SPAN value of the antimicrobial particles may be 0.8 to 1.8, 0.8 to 1.5, or 0.8 to 1.3.

In particular, according to an embodiment of the present invention, the antimicrobial particles comprise copper particles or copper particles deposited on a support. In particular, the copper particles are contained in the antimicrobial filter in various forms according to the particle diameter of the copper particles. Thus, there is technical significance in that it is possible to increase the content of active copper particles bound to the surface of a fiber, whereby antimicrobial performance and antimicrobial persistence performance can be further enhanced.

Specifically, when conventional nano-sized antimicrobial particles, such as nano-sized copper particles, are used, there is a problem in that most of the copper particles are embedded in the fiber and the amount of active copper particles located on the fiber surface is lowered, resulting in a decrease in antimicrobial performance.

An embodiment of the present invention is characterized in that the content ratio of the active copper particles located on the fiber surface is increased by using antimicrobial particles having large particles.

That is, in order to increase the content of active copper particles bound to the fiber surface, the size of the antimicrobial particles bonded to the fiber surface may be adjusted to an appropriate range in micro units.

For example, if the copper particles are nano-sized, antimicrobial particles obtained by depositing the copper particles on a support may be employed in the antimicrobial filter.

If the copper particles are micro-sized, the copper particles may be used without using a support. In such an event, it may be important to adjust the copper particles to a specific micro-sized particle diameter range so that they can be bound to the fiber surface.

In addition, in the present invention, as long as the content ratio of the active copper particles bound to the fiber surface can be satisfied within the above specific range, the antimicrobial particles may be employed in various methods and configurations.

Hereinafter, an antimicrobial filter according to various embodiments will be described in more detail
<Antimicrobial Particles: Copper Particles Deposited on a Support>

According to an embodiment, the antimicrobial particles may comprise copper particles deposited on a support.

When the antimicrobial particles comprise copper particles deposited on a support, the copper particles may have a nano-sized average particle diameter (D50).

Since the copper particles having a nano-sized average particle diameter (D50) can be bound to the fiber surface through a support, the content ratio of the active copper particles can be increased, thereby further enhancing antimicrobial properties.

If the copper particles are nano-sized and contained in the antimicrobial filter without being deposited on a support, the copper particles may be easily detached from the fiber, or the content of inactive copper particles partially or entirely embedded in the fiber may increase, resulting in difficulties in imparting the desired antimicrobial properties.

On the other hand, if antimicrobial particles obtained by depositing nano-sized copper particles on a support are employed, the content ratio of active copper particles bound to the fiber surface may be increased, whereby antimicrobial performance and antimicrobial persistence performance can be further enhanced.

The copper particles deposited on a support may have an average particle diameter (D50) of 1 to 10 nm, specifically, 1 to 9 nm, 1 to 8 nm, or 1 to 6 nm.

As the average particle diameter (D50) of the copper particles satisfies the above range, deposition on the support is readily carried out, and an even particle size distribution can be achieved.

Any material that is resistant to heat and does not produce secondary by-products may be used as the support without limitation.

For example, the support may comprise at least one selected from calcium carbonate and quartz. Specifically, the support may comprise calcium carbonate.

When copper particles are deposited on the support, for example, calcium carbonate, the calcium carbonate is resistant to heat and does not produce secondary by-products even during a high-temperature process; thus, the copper particles are deposited on the calcium carbonate without side reactions to be bound to the fiber surface during the process.

The average particle diameter (D50) of the support may be 1 to 5 μm, specifically, 1 to 4 μm or 1 to 3 μm. If the average particle diameter (D50) of the support exceeds the above range, the copper particles deposited on the support are not bound to the fiber surface and are easily detached, resulting in poor mass productivity. If the average particle diameter (D50) of the support satisfies the above range, when copper particles are deposited on the support, it may serve as a support so that the deposited copper particles can be bound to the fiber surface for a long period of time, which is advantageous for enhancing antimicrobial performance and antimicrobial persistence performance.

When the antimicrobial particles comprise copper particles deposited on a support, the content ratio ($Cu_{AR}$) of the active copper particles bound to the fiber surface may be 5% to 20%, 5% to 10%, or 5% to 8%.

The content of the total copper particles contained in the antimicrobial filter (Cur), by weight, may be, for example, 350 to 10,000 ppm, 350 to 8,000 ppm, 350 to 5,000 ppm, 400 to 3,000 ppm, or 400 to 1,000 ppm.

The content of the active copper particles bound to the fiber surface ($Cu_A$), by weight, may be, for example, 15 to 5,000 ppm, 15 to 3,000 ppm, 17 to 2,000 ppm, 20 to 1,000 ppm, 20 to 500 ppm, 20 to 250 ppm, or 20 to 100 ppm.

In addition, the absolute value of a deviation in $Cu_A$ may be, for example, 50 ppm or less, 20 ppm or less, 12 ppm or less, 11 ppm or less, 10 ppm or less, or 8 ppm or less.
<Antimicrobial Particles: Copper Particles>

According to another embodiment, the antimicrobial particles may comprise copper particles alone.

In such a case, the particle size of the copper particles may be very important in order to satisfy the content ratio of the active copper particles bound to the fiber surface within the specific range.

Specifically, the average particle diameter (D50) of the copper particles that is 50% of the cumulative volume (%) in a particle size distribution measured by the laser diffraction method may be 1 to 8 μm, 1 to 7 μm, 2 to 5 μm, or 2 to 3 μm. If the average particle diameter (D50) of the copper particles satisfies the above range, it is possible to increase the content of active copper particles bound to the fiber surface, whereby antimicrobial performance and antimicrobial persistence performance can be further enhanced.

If the average particle diameter (D50) of the copper particles exceeds the above range, the average particle diameter becomes too large, which may cause a problem in that they may be detached from the fiber surface, or the fiber may be broken, rather than they are bound to the fiber surface. In addition, if the average particle diameter (D50) of the copper particles is less than the above range, when the copper particles are used alone without deposition on a support, the content of inactive copper particles partially or entirely embedded in the fiber may increase, whereby antimicrobial performance and antimicrobial persistence performance may be further reduced.

In the measurement of a particle size distribution by the laser diffraction method, the particle diameter (D10) of the copper particles that is 10% of the cumulative volume (%) may be 1 to 4 μm, 1 to 3 μm, 1 to 2 μm, or 1.2 to 1.8 μm.

In addition, in the measurement of a particle size distribution by the laser diffraction method, the particle diameter (D90) of the copper particles that is 90% of the cumulative volume (%) may be 2 to 10 μm, 3 to 9 μm, 3 to 8 μm or 3 to 6 μm.

The absolute value of a deviation in the diameter of the copper particles may be 1 to 3 μm, 1 to 2.8 μm, or 1 to 2.5 μm.

The SPAN value of the copper particles represented by the above Equation 3 may be 0.8 to 2, 0.8 to 1.8, 0.8 to 1.5, or 0.8 to 1.3.

When the antimicrobial particles are copper particles, the content ratio ($Cu_{AR}$) of the active copper particles bound to the fiber surface may be 5 to 20%, 10 to 20%, or 15 to 20%.

The content of the total copper particles contained in the antimicrobial filter ($Cu_T$), by weight, may be, for example, 1,000 to 50,000 ppm, 3,000 to 50,000 ppm, 5,000 to 40,000 ppm, 7,000 to 40,000 ppm, or 9,000 to 40,000 ppm.

The content of the active copper particles bound to the fiber surface ($Cu_A$), by weight, may be, for example, 200 to 10,000 ppm, 700 to 10,000 ppm, 1,000 to 10,000 ppm, 1,200 to 10,000 ppm, or 1,400 to 8,000 ppm.

In addition, the absolute value of a deviation in $Cu_A$ may be, for example, 100 ppm or less, 80 ppm or less, 60 ppm or less, 40 ppm or less, 30 ppm or less, 20 ppm or less, or 18 ppm or less.

If the content of the active copper particles satisfies the above range, antimicrobial performance and antimicrobial persistence performance can be further enhanced.

<Antimicrobial Particles: Comprising Copper Particles and Other Antimicrobial Particles>

According to another embodiment, the antimicrobial particles may comprise copper particles and other antimicrobial particles than the copper particles.

The other antimicrobial particles may comprise inorganic antimicrobial particles. For example, the antimicrobial particles may include copper particles and zinc oxide particles.

In such a case, in the measurement of a particle size distribution by the laser diffraction method, the particle diameter (D50) of the copper particles that is 50% of the cumulative volume (%) may be 1 to 8 μm, 1 to 7 μm, 2 to 5 μm, or 2 to 3 μm. If the average particle diameter (D50) of the copper particles satisfies the above range, antimicrobial performance and antimicrobial persistence performance can be further enhanced.

In addition, in the measurement of a particle size distribution by the laser diffraction method, the particle diameter (D10) of the copper particles that is 10% of the cumulative volume (%) may be 1 to 4 μm, 1 to 3 μm, 1 to 2 μm, or 1.2 to 1.8 μm.

In addition, in the measurement of a particle size distribution by the laser diffraction method, the particle diameter (D90) of the copper particles that is 90% of the cumulative volume (%) may be 2 to 10 μm, 3 to 9 μm, 3 to 8 μm or 3 to 6 μm.

The absolute value of a deviation in the diameter of the copper particles may be 1 to 3 μm, 1 to 2.8 μm, or 1 to 2.5 μm.

The SPAN value of the copper particles represented by the above Equation 3 may be 0.8 to 2, 0.8 to 1.8, 0.8 to 1.5, or 0.8 to 1.3.

In addition, the content ratio ($Cu_{AR}$) of the active copper particles bound to the fiber surface may be 5 to 20%, 10 to 20%, 12 to 20%, or 12 to 17%.

The content of the total copper particles contained in the antimicrobial filter ($Cu_T$), by weight, may be, for example, 5,000 to 50,000 ppm, 7,000 to 40,000 ppm, 7,000 to 30,000 ppm, or 8,000 to 20,000 ppm.

The content of the active copper particles bound to the fiber surface ($Cu_A$), by weight, may be, for example, 200 to 10,000 ppm, 500 to 10,000 ppm, 700 to 8,000 ppm, 1,000 to 5,000 ppm, 1,200 to 3,000 ppm, or 1,200 to 2,000 ppm.

In addition, the absolute value of a deviation in $Cu_A$ may be, for example, 100 ppm or less, 80 ppm or less, 60 ppm or less, 40 ppm or less, 30 ppm or less, 20 ppm or less, 17 ppm or less, or 15 ppm or less.

If the content of the active copper particles satisfies the above range, antimicrobial performance and antimicrobial persistence performance can be further enhanced.

In the measurement of a particle size distribution of the other antimicrobial particles, such as zinc oxide particles, that may be contained in the antimicrobial filter by the laser diffraction method, the particle diameter (D50) of the zinc oxide particles that is 50% of the cumulative volume (%) may be 0.2 to 2 μm, 0.3 to 1.5 μm, 0.5 to 1.5 μm, or 0.6 to 1.2 μm. If the average particle diameter (D50) of the zinc oxide particles satisfies the above range, antimicrobial performance and antimicrobial persistence performance can be further enhanced.

The weight ratio of the copper particles and the zinc oxide particles (copper particles:zinc oxide particles) contained in the antimicrobial filter may be 1:0.5 to 2, for example, 1:0.5 to 1.5, for example, 1:0.5 to 1.0, or, for example, 1:0.5 to 0.8.

In addition, various inorganic antimicrobial particles having antimicrobial performance may be used as the other antimicrobial particles in addition to the zinc oxide particles to the extent that the effect of the present invention is not impaired.

According to an embodiment of the present invention, the copper particles may be present as uniformly and evenly dispersed in the antimicrobial filter.

In addition, the copper particles and the other antimicrobial particles may each be present in a uniformly dispersed form in the antimicrobial filter.

Meanwhile, the antimicrobial filter may comprise a fiber formed from a polymer resin.

The polymer resin is a synthetic resin capable of forming fibers, and all types of synthetic resins that can be used as fibers may be used without particular limitations. The polymer resin may comprise, for example, at least one selected from the group consisting of polypropylene (PP), polyethylene (PE), polystyrene (PS), polyvinyl acetate (PVAc), polyacrylate, polyethylene terephthalate (PET), polyvinyl chloride (PVC), polymethyl methacrylate (PMMA), ethylene-vinyl acetate copolymers (EVA), polycarbonate (PC), polyamide, and silicone-based resins. The polymer resin may comprise at least one selected from the group consisting of polypropylene (PP), polyethylene (PE), and polyethylene terephthalate (PET). For example, the polymer resin may comprise polypropylene (PP), which is a material for a melt-blown nonwoven fabric.

The polymer resin may have a melt flow index (MI) of 220 to 1,100, 220 to 1,000, 220 to 900, or 220 to 800.

The weight ratio of the polymer resin and the antimicrobial particles (polymer resin:antimicrobial particles) may be 1:0.02 to 0.5. Specifically, the weight ratio of the polymer resin and the antimicrobial particles may be, for example, 1:0.02 to 0.4, for example, 1:0.02 to 0.3, for example, 1:0.02 to 0.1, for example, 1:0.02 to 0.08 for example, 1:0.02 to 0.07, or, for example, 1:0.02 to 0.06. As the content of the antimicrobial particles satisfies the above range, it is possible to effectively prevent microorganisms harmful to the human body, such as bacteria, mold, viruses, and the like, from proliferating on the filter surface; thus, it can have excellent antimicrobial properties and further enhance the durability and lifespan characteristics of the filter by virtue of an excellent filter damage prevention effect.

In addition, when the antimicrobial filter is sampled at a size of 30 cm in width and 30 cm in length and measured by the method prescribed in Notice No. 2019-70 of the National Institute of Environmental Research, the release amount of copper after 96 hours at an operating flow rate of 10 m³/minute at a temperature of 20±5° C. and a humidity of 65±10% may be 70 mg or less. For example, the release amount of copper may be 50 mg or less, 40 mg or less, 30 mg or less, 20 mg or less, 18 mg or less, 15 mg or less, 10 mg or less, 8 mg or less, or 7 mg or less, and may be 0.01 mg to 50 mg, 0.05 mg to 50 mg, 0.1 mg to 40 mg, 0.2 mg to 30 mg, 0.5 mg to 20 mg, 0.8 mg to 18 mg, 1 mg to 15 mg, or 0.9 mg to 10 mg. In addition, the release amount of copper may be 0.01 mg to 8 mg, 0.01 mg to 5 mg, 0.01 mg to 2 mg, or 0.01 mg to 1 mg.

In general, an organic material or an inorganic material may be applied in order to enhance the antimicrobial properties of a filter system. However, as such an organic or inorganic substance is released into the air, it may cause a problem in that it is harmful to the human body. However, in the antimicrobial filter according to an embodiment of the present invention, the release amount of copper, which is an antimicrobial material, is 70 mg or less, for example, 50 mg or less; thus, its safety is excellent, and antimicrobial properties can be continuously maintained.

Due to the harmfulness of such a filter to the human body, the National Institute of Environmental Research has established a procedure for measuring the concentration of chemical substances in antimicrobial filters for air purification through the "Regulations on Standards and Methods for Testing and Inspection of Household Chemicals Subject to Safety Confirmation" (Ministry of Environment Notice No. 2019-45).

For example, the release amount of copper may be measured by the method prescribed in Notice No. 2019-70 of the National Institute of Environmental Research. A sample of the antimicrobial filter is sampled in a width of 30 cm and a length of 30 cm and mounted on a measuring device, it is subjected to continuous operation for 96 hours at an operational flow rate of 10 m$^3$/minute under the conditions of a temperature of 20±5° C. and a humidity of 65±10%, and the release amount of copper (ΔCR) may be calculated according to the following Equation 4. Here, three samples of the antimicrobial filter are each subjected to the test for measuring the release amount, and an average value is calculated from the measured release amounts of copper.

$$\Delta CR = C_0 - C_1 \qquad \text{[Equation 4]}$$

In Equation 4, $C_0$ is the initial content (mg) of copper, and $C_1$ is the content (mg) of copper remaining in the filter after continuous operation for 96 hours at an operational flow rate of 10 m$^3$/minute under the conditions of a temperature of 20±5° C. and a humidity of 65±10%.

The antimicrobial filter according to another embodiment of the present invention has a bacteria reduction rate of 85% or more according to the following Equation 5.

$$BR(\%) = \frac{BT1 - BT2}{BT1} \times 100 \qquad \text{[Equation 5]}$$

In Equation 5, BT1 is the number of bacteria after incubating the bacteria on a polypropylene melt-blown nonwoven fabric containing no copper particles at 28±2° C. for 18 hours, and BT2 is the number of bacteria after incubating the bacteria with the antimicrobial filter under the same conditions.

The antimicrobial filter according to an embodiment of the present invention has excellent air permeability and serves as a filtering unit that can filter fine dust as well. It is possible to effectively prevent microorganisms harmful to the human body, such as bacteria, mold, and viruses, from proliferating on the surface of the filter, resulting in excellent antimicrobial properties.

Specifically, the bacteria reduction rate of the antimicrobial filter according to Equation 5 may be 86% or more, 88% or more, 90% or more, 96% or more, 97% or more, 99% or more, 99.5% or more, or 99.9% or more. As the bacteria reduction rate of the antimicrobial filter satisfies the above range, the antimicrobial filter has excellent antimicrobial properties.

The bacteria reduction rate according to Equation 5 may be measured by the method stipulated in KS K 0693-2001.

Specifically, the bacteria reduction rate may be measured using *E. coli* (e.g., *Escherichia coli* NBRC 3301), but it is not limited thereto.

For example, a strain is incubated using a nutrient medium, and the number of viable bacteria is calculated by measuring the O.D. (optical density) value at 660 nm using an absorbance photometer. This is diluted with a nutrient medium such that the initial number of bacteria has been adjusted, which may be used as an inoculum. The antimicrobial filter is placed in a glass container with a lid, the inoculum is evenly sprayed, it is then incubated for 18 hours at 28±2° C., the number of bacteria is measured, and the bacteria reduction rate (%) is determined according to Equation 5.

In Equation 5, BT1 is the number of bacteria after incubating the bacteria on a polypropylene melt-blown nonwoven fabric containing no copper particles at 28±2° C. for 18 hours, which may stand for a control group. BT2 is the number of bacteria after incubating the bacteria with the antimicrobial filter under the same conditions, which may stand for a test group.

Meanwhile, the antimicrobial filter may further comprise additives such as an antistatic agent, a softener, an absorbent, a moisture absorbent, a deodorant, a water repellent, an antifouling agent, and a flame retardant within a range that does not impair antimicrobial properties.

Process for Preparing an Antimicrobial Filter

The present invention provides a process for preparing the antimicrobial filter.

The process for preparing an antimicrobial filter according to an embodiment of the present invention comprises a first step of mixing and extruding antimicrobial particles and a first polymer resin to obtain a first masterbatch; a second step of mixing the first masterbatch with second polymer resin pellets to obtain a mixture; and a third step of melt-spinning the mixture, wherein the antimicrobial filter comprises a fiber formed from a polymer resin and antimicrobial particles, the antimicrobial particles comprise copper particles or copper particles deposited on a support, the copper particles comprise active copper particles bound to the surface of the fiber and inactive copper particles partially or entirely embedded in the fiber, and the content ratio ($Cu_{AR}$) of the active copper particles represented by the above Equation 1 is 5 to 20%.

According to an embodiment of the present invention, the antimicrobial particles are mixed with a first polymer resin and extruded to obtain a first masterbatch, which is mixed with second polymer resin pellets and composite melt-spun, whereby an antimicrobial filter that has excellent antimicrobial performance and antimicrobial persistence performance can be provided by an efficient method.

That is, in the present invention, the antimicrobial particles can be directly spun, and the antimicrobial particles are uniformly and evenly contained on the surface of the fiber thus obtained, so that contamination of the filter caused by airborne microorganisms can be effectively prevented.

FIG. 1 is a flowchart (S100) illustrating a process for preparing an antimicrobial filter according to an embodiment of the present invention.

Referring to FIG. 1, the process for preparing an antimicrobial filter may comprise a first step (S110) of mixing and extruding antimicrobial particles and a first polymer resin to obtain a first masterbatch.

The antimicrobial particles may comprise copper particles or copper particles deposited on a support. Details of the copper particles and the support are as described above.

The first polymer resin may comprise at least one selected from the group consisting of polypropylene (PP), polyethylene (PE), polystyrene (PS), polyvinyl acetate (PVAc), polyacrylate, polyethylene terephthalate (PET), polyvinyl chloride (PVC), polymethyl methacrylate (PMMA), ethylene-vinyl acetate copolymers (EVA), polycarbonate (PC), polyamide, and silicone-based resins. The first polymer resin may comprise at least one selected from the group consisting of polypropylene (PP), polyethylene (PE), and polyethylene terephthalate (PET). For example, the first polymer resin may be in the form of pellets and comprise polypropylene (PP) pellets, which is a material for a melt-blown nonwoven fabric.

The mixing may be carried out by mixing the first polymer resin and the antimicrobial particles at a weight ratio (first polymer resin:antimicrobial particles) of 1:0.15 to 0.5, specifically, 1:0.15 to 0.4 or 1:0.2 to 0.3, and stirring them at room temperature for 1 to 4 hours, specifically, 1 to 3 hours.

According to an embodiment of the present invention, the masterbatch may further comprise additives such as an antistatic agent, a softener, an absorbent, a moisture absorbent, a deodorant, a water repellent, an antifouling agent, and a flame retardant. The additives may be employed in an amount of 0.01 to 5 parts by weight relative to 100 parts by weight of the first polymer resin.

The process for preparing an antimicrobial filter may comprise a second step (S120) of mixing the first masterbatch with second polymer resin pellets to obtain a mixture.

The second polymer resin may comprise the same type as the first polymer resin.

The mixing weight ratio of the second polymer resin pellets and the first masterbatch (second polymer resin pellets:first masterbatch) may be 1:0.01 to 0.3, for example, 1:0.02 to 0.2, for example, 1:0.03 to 0.15.

In addition, the mixing may be carried out at room temperature for 1 hour or longer, for example, 1 hour to 10 hours, for example, 2 hours to 8 hours, for example, 1 hour to 6 hours or 1 to 2 hours.

The process for preparing an antimicrobial filter may comprise a third step (S130) of melt-spinning the mixture.

The melt-spinning may be carried out using a double-component composite spinning method or a simple spinning method. In addition, it is also possible to produce short fibers. In order to maximize the antimicrobial effect, good flowability of the polymer resin may be induced during spinning, and stretching may be induced to some extent so that the resulting fiber may have a stretching effect.

The melt-spinning may be carried out at a temperature of 150° C. to 250° C. For example, the mixture may be melted and spun at a temperature of 150° C. to 250° C. through a melt-blown nonwoven fabric manufacturing facility in the Korea Institute of Industrial Technology to obtain an antimicrobial fiber.

Hereinafter, the process for preparing an antimicrobial filter according to an embodiment of the present invention will be described in more detail.

Figure 2:
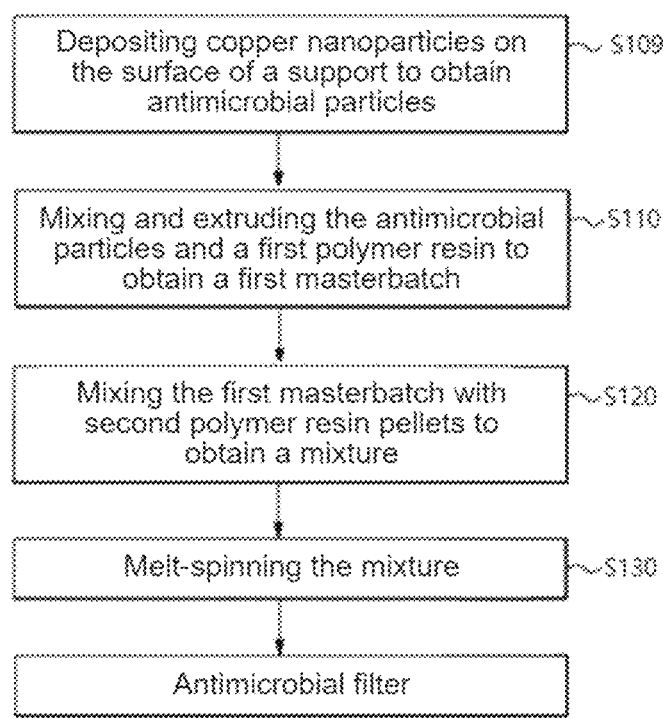
FIG. 2 is a flowchart illustrating a process for preparing an antimicrobial filter according to another embodiment of the present invention.

Referring to FIG. 2, the process for preparing an antimicrobial filter (S100A) according to an embodiment of the present invention may comprise depositing copper nanoparticles on the surface of a support to obtain antimicrobial particles (S109); mixing and extruding the antimicrobial particles and a first polymer resin to obtain a first masterbatch (S110); mixing the first masterbatch with second polymer resin pellets to obtain a mixture (S120); and melt-spinning the mixture (S130).

Specifically, the process for preparing an antimicrobial filter (S100A) may comprise depositing copper nanoparticles on the surface of a support to obtain antimicrobial particles (S109).

The copper nanoparticles can be obtained in nanoparticle size using electro plasma, which may be deposited on the surface of a support to obtain antimicrobial particles.

Figure 5:
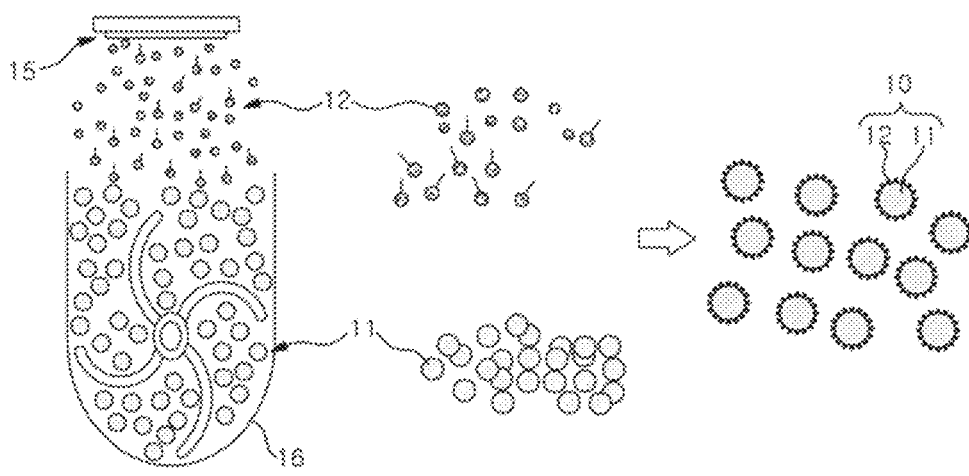
FIG. 5 schematically illustrates a process for preparing antimicrobial particles according to an embodiment of the present invention.

FIG. 5 schematically illustrates a process for preparing antimicrobial particles according to an embodiment of the present invention in which copper particles are deposited on a support.

Referring to FIG. 5, in order to deposit copper particles (12) on the surface of a support (11), a copper plate may be disposed above a stirrer (16). The method of depositing copper particles with a copper plate has an advantage in that it is economical in terms of cost, easy to process, and non-toxic, while providing antimicrobial and deodorizing properties.

The copper plate may have a thickness of 0.5 cm to 1.5 cm, a width of 15 to 20 cm, and a length of 7 to 10 cm. However, the size and thickness of the copper plate may be variously modified according to the size of the antimicrobial filter to be manufactured.

The support (11) is put in the stirrer (16) and stirred, and copper particles may be deposited on the surface of the support using electro plasma to obtain antimicrobial particles.

The deposition may be carried out using an electro plasma under a vacuum of $10^{-4}$ to $10^{-8}$ Torr, for example, $10^{-3}$ to $10^{-8}$ Torr, and with a power of 50 to 80 kW, for example, 55 to 75 kW.

In addition, the deposition using electro plasma may be carried out while stirring 35 to 100 kg, for example, 35 to 80 kg, of the support at a speed of 20 to 30 kg/hr, for example, 20 to 30 kg/hr.

The process for preparing an antimicrobial filter (S100A) may comprise mixing and extruding the antimicrobial particles and a first polymer resin to obtain a first masterbatch (S110).

The step of obtaining a first masterbatch (S110) in the process for preparing an antimicrobial filter (S100A) is as described above in the process for preparing an antimicrobial filter (S100).

The process for preparing an antimicrobial filter (S100A) may comprise mixing the first masterbatch with second polymer resin pellets to obtain a mixture (S120); and melt-spinning the mixture (S130).

The step of obtaining a mixture (S120) and the step of melt-spinning the mixture (S130) in the process for preparing an antimicrobial filter (S100A) are as described above in the process for preparing an antimicrobial filter (S100).

Referring to FIG. 3, the process for preparing an antimicrobial filter (S100B) according to another embodiment of the present invention may comprise mixing and extruding copper particles and a first polymer resin to obtain a first masterbatch (S110'); mixing the first masterbatch with second polymer resin pellets to obtain a mixture (S120); and melt-spinning the mixture (S130).

Specifically, the process for preparing an antimicrobial filter (S100B) may comprise mixing and extruding copper particles and a first polymer resin to obtain a first masterbatch (S110').

The average particle diameter (D50) of the copper particles that is 50% of the cumulative volume (%) in a particle size distribution measured by the laser diffraction method may be 1 to 8 μm, 1 to 7 μm, 2 to 5 μm, or 2 to 3 μm.

In addition, in the measurement of a particle size distribution by the laser diffraction method, the particle diameter (D10) of the copper particles that is 10% of the cumulative volume (%) may be 1 to 4 μm, 1 to 3 μm, 1 to 2 μm, or 1.2 to 1.8 μm.

In addition, in the measurement of a particle size distribution by the laser diffraction method, the particle diameter (D90) of the copper particles that is 90% of the cumulative volume (%) may be 2 to 10 μm, 3 to 9 μm, 3 to 8 μm or 3 to 6 μm.

The absolute value of a deviation in the diameter of the copper particles may be 1 to 3 μm, 1 to 2.8 μm, or 1 to 2.5 μm.

The SPAN value of the copper particles represented by the above Equation 3 may be 0.8 to 2, 0.8 to 1.8, 0.8 to 1.5, or 0.8 to 1.3.

The first polymer resin is as described above.

The mixing may be carried out by mixing the first polymer resin and the copper particles at a weight ratio (first polymer resin:copper particles) of 1:0.15 to 0.5, specifically, 1:0.15 to 0.4, and stirring them at room temperature for 1 to 4 hours, specifically, for 1 to 3 hours.

The process for preparing an antimicrobial filter (S100B) may comprise mixing the first masterbatch with second polymer resin pellets to obtain a mixture (S120); and melt-spinning the mixture (S130).

The step of obtaining a mixture (S120) and the step of melt-spinning the mixture (S130) in the process for preparing an antimicrobial filter (S100B) are as described above in the process for preparing an antimicrobial filter (S100).

Referring to FIG. 4, the process for preparing an antimicrobial filter (S100C) according to another embodiment of the present invention may comprise mixing and extruding copper particles and a first polymer resin to obtain a first masterbatch (S110'); mixing the first masterbatch, a second masterbatch containing zinc oxide particles (also referred to as a second masterbatch containing zinc oxide), and second polymer resin pellets to obtain a mixture (S120'); and melt-spinning the mixture (S130).

Specifically, the process for preparing an antimicrobial filter (S100C) may comprise mixing and extruding copper particles and a first polymer resin to obtain a first masterbatch (S110').

The step of obtaining a first masterbatch (S110') is as described in the step (S110') of obtaining a first masterbatch in the process for preparing an antimicrobial filter (S100B).

The process for preparing an antimicrobial filter (S100C) may comprise mixing the first masterbatch, a second masterbatch containing zinc oxide particles, and second polymer resin pellets to obtain a mixture (S120').

The second masterbatch containing zinc oxide particles may be obtained by mixing and extruding zinc oxide particles and a third polymer resin.

The zinc oxide particles may have an average particle diameter (D50) of 0.2 to 2 μm, 0.3 to 1.5 μm, 0.5 to 1.5 μm, or 0.6 to 1.2 μm.

If the copper particles and the zinc oxide particles are mixed, while the copper particles and the zinc oxide particles are not made into a masterbatch, respectively, they tend to agglomerate with each other. Thus, it is preferable to mix the first masterbatch containing the copper particles and the second masterbatch containing the zinc oxide particles.

As a result, the copper particles and the zinc oxide particles may each be present in a uniformly dispersed form in the antimicrobial filter.

The third polymer resin may be the same type as the first polymer resin.

The weight ratio of the second polymer resin pellets to the first masterbatch to the second masterbatch containing zinc oxide may be 1:0.05 to 0.3:0.02 to 0.1 or 1:0.08 to 0.3:0.04 to 0.1. The mixing may be carried out at room temperature for 1 hour to 10 hours, for example, 2 hours to 8 hours, for example, 1 hour to 6 hours or 1 hour to 2 hours.

The process for preparing an antimicrobial filter (S100C) may comprise melt-spinning the mixture (S130).

The step of melt-spinning the mixture (S130) is as described in the process for preparing an antimicrobial filter (S100).

An antimicrobial fiber may be obtained through the melt-spinning.

The form of the spun antimicrobial fiber may comprise at least one selected from the group consisting of multifilament and monofilament, which are long fibers, and short fibers.

In the preparation of the antimicrobial filter, an antistatic agent, a softener, an absorbent, a deodorant, a water repellent, an antifouling agent, a flame retardant, an antimite agent, or the like may be applied by post-processing to the extent that the antimicrobial performance is not impaired. Moisture permeable and waterproof processing is also applicable.

The antimicrobial fiber thus obtained can have excellent antimicrobial performance, as well as dust collection efficiency, as the copper particles are uniformly and evenly distributed; thus, it can be advantageously used as an antimicrobial dust-collecting filter.

The antimicrobial fiber thus obtained can have excellent antimicrobial performance, as well as dust collection efficiency, as the content ratio of the active copper particles satisfies a specific range, and the copper particles are uniformly and evenly distributed; thus, it can be advantageously used as an antimicrobial dust-collecting filter.

An antimicrobial filter, specifically, an antimicrobial dust-collecting filter, can be obtained using the antimicrobial fiber.

Specifically, the antimicrobial filter may be formed by pleating an antimicrobial filter medium using the antimicrobial fiber.

In addition, the antimicrobial filter comprising the pleated filter medium may be disposed inside a housing. The housing may serve as a frame supporting the antimicrobial filter medium and may be assembled or molded such that the antimicrobial filter medium can be properly disposed and seated. The shape or structure of the housing may be arbitrarily determined according to the purpose of use or the environment of use.

The material of the housing may be a material of a conventional housing used for a dust collecting filter. Specifically, at least one selected from the group consisting of an acrylonitrile-butadiene-styrene copolymer (ABS), polypropylene (PP), paper, nonwoven fabrics, polycarbonate (PC), and elastomer resins may be used as a material of the housing.

More specifically, ABS or PP may be used as the material of the housing, and ABS may be preferably used in consideration of the fact that dimensional accuracy may be readily secured and deformation during use may be suppressed. In addition, polyethylene terephthalate (PET) and ABS have high adhesion to each other. Thus, when PET is used for the antimicrobial filter medium, and ABS is used for the housing, the prevention of delamination of the antimicrobial filter medium and the housing may be enhanced.

The antimicrobial filter medium may be disposed inside the housing by molding.

According to an embodiment of the present invention, the antimicrobial filter medium may be pleated to be disposed inside the housing. Specifically, the antimicrobial filter medium may have a structure in which pleats are formed by bending. The shape of the pleats may vary, such as zigzag-type angular pleats or rounded pleats. The shape and size of the pleats are not particularly limited.

If the antimicrobial filter medium is formed as pleated in a dust collecting filter, the filtration area is wide to reduce the pressure loss and increase the life span of the filter. In addition, if the filter medium is formed as pleated in a dust collecting filter, the structure is firm, which enhances the durability and lifespan characteristics.

Air Purifier

The present invention provides an air purifier comprising the antimicrobial filter.

The air purifier comprises an inlet for introducing polluted air; an outlet for discharging purified air; and a filter unit disposed between the inlet and the outlet, wherein the filter unit comprises an antimicrobial filter, the antimicrobial filter comprises a fiber formed from a polymer resin and antimicrobial particles, the antimicrobial particles comprise copper particles or copper particles deposited on a support, the copper particles comprise active copper particles bound to the surface of the fiber and inactive copper particles partially or entirely embedded in the fiber, and the content ratio ($Cu_{AR}$) of the active copper particles represented by the above Equation 1 is 5 to 20%:

Details on the antimicrobial filter are as described above. In addition, the air purifier may be equipped with the antimicrobial filter.

The air purifier may be provided with an inlet in the front for introducing indoor air, an outlet formed at the upper part for discharging purified air, and a filter unit comprising the air purifying filter inside thereof.

In addition, the air purifier may be equipped with a blower unit. Specifically, the blower unit of the air purifier may be provided with a blower fan that introduces indoor air by a rotational force and discharges purified air to the room. The blower fan introduces air through the front inlet and discharges it through the upper outlet. The outlet is provided with an outlet grill having a dense grid shape. As a result, it is possible to prevent the user's body from being injured by the rotating blower fan.

The filter unit may further comprise an additional filter in addition to the antimicrobial filter. For example, it may further comprise a pre-filter for removing relatively large dust, mold, hair, pet hair, and the like and/or a dehumidifying filter having a plurality of pores to remove moisture in the air.

The antimicrobial filter according to an embodiment of the present invention may be variously used as a filter for an air ventilator, a filter for air purification, or a filter for an air conditioner, in addition to a filter for an air purifier.

MODE FOR THE INVENTION

Hereinafter, the present invention will be described in detail with reference to Examples. But the following examples are intended to illustrate the present invention, and the scope of the present invention is not limited thereto only.

Example 1

A stirrer, above which a copper plate having a thickness of about 1.5 cm, a width of about 20 cm, and a length of about 10 cm had been equipped, was charged with about 50 kg of $CaCO_3$ having a size of about 1 μm. While it was stirred at a speed of about 20 kg/hr, copper particles having an average particle diameter (D50) of about 7 nm were deposited using electro plasma on the surface of $CaCO_3$ with a power of about 70 kW under a vacuum of about $10^{-7}$ Torr to obtained antimicrobial particles.

The antimicrobial particles and polypropylene (PP) resin pellets having a particle diameter of about 2 mm, as a first polymer resin, were mixed and extruded to obtain a masterbatch having a particle diameter of about 2 mm. The mixing was carried out by mixing the first polymer resin and the antimicrobial particles at a ratio of about 1:0.25 (weight ratio) and stirring them at room temperature for about 2 hours.

Second polymer resin pellets (polypropylene (PP) resin pellets having a particle diameter of about 2 mm) and the above masterbatch were mixed at a ratio of about 9:1 (weight ratio) and stirred at room temperature for about 2 hours to obtain a mixture.

The mixture was melted and spun at a temperature of about 180° C. through a melt-blown nonwoven fabric manufacturing facility in the Korea Institute of Industrial Technology to obtain an antimicrobial fiber, which was used to prepare an antimicrobial filter (antimicrobial dust-collecting filter: 748 mm (width)×589 mm (length)×20 mm (thickness)).

The content of the total copper particles and the content of the active copper particles contained in the final antimicrobial filter and the absolute value of a deviation in the contents are shown in Table 2 below.

Example 2

An antimicrobial filter was prepared in the same manner as in Example 1, except that the content of the total copper particles and the content of the active copper particles contained in the final antimicrobial filter and the absolute value of a deviation in the contents were changed as shown in Table 2.

Example 3

Spherical copper particles with an average particle diameter (D50) of about 2.8 μm produced by melting copper and spraying it using high-pressure gas and polypropylene (PP) resin pellets having a particle diameter of about 2 mm, as a first polymer resin, were mixed and extruded to obtain a first masterbatch having a particle diameter of about 2 mm.

Polypropylene (PP) resin pellets having a particle diameter of about 2 mm, as second polymer resin pellets, and the above masterbatch were mixed at a ratio of about 9:1 (weight ratio) and stirred at room temperature for about 2 hours to obtain a mixture.

The mixture was melted and spun at a temperature of about 180° C. through a melt-blown nonwoven fabric manufacturing facility in the Korea Institute of Industrial Technology to obtain an antimicrobial fiber, which was used to prepare an antimicrobial filter (antimicrobial dust-collecting filter).

The content of the total copper particles and the content of the active copper particles contained in the final antimicrobial filter and the absolute value of a deviation in the contents are shown in Table 2 below.

Example 4

An antimicrobial filter was prepared in the same manner as in Example 3, except that the content of the total copper particles and the content of the active copper particles contained in the final antimicrobial filter and the absolute value of a deviation in the contents were changed as shown in Table 2.

Example 5

The first masterbatch obtained in Example 3 was used as a first masterbatch.

Meanwhile, zinc oxide particles having an average particle diameter (D50) of about 1 μm and polypropylene (PP) resin pellets having a particle diameter of about 2 mm, as a third polymer resin, were mixed and extruded to obtain a second masterbatch.

A second polymer resin (polypropylene (PP) resin pellets having a particle diameter of about 2 mm), the first masterbatch containing copper particles, and the second masterbatch containing zinc oxide particles were mixed at a ratio of about 8.5:1:0.5 (weight ratio) and stirred at room temperature for about 2 hours to obtain a mixture.

The mixture was melted and spun at a temperature of about 180° C. through a melt-blown nonwoven fabric manufacturing facility in the Korea Institute of Industrial Technology to obtain an antimicrobial fiber, which was used to prepare an antimicrobial filter (antimicrobial dust-collecting filter).

The content of the total copper particles and the content of the active copper particles contained in the final antimicrobial filter and the absolute value of a deviation in the contents are shown in Table 2 below.

Comparative Example 1

A polypropylene melt-blown nonwoven fabric containing no antimicrobial particles was used.

Comparative Example 2

A stirrer, above which a copper plate having a thickness of about 1.5 cm, a width of about 20 cm, and a length of about 10 cm had been equipped, was charged with about 40 kg of polypropylene (PP) resin pellets (as a first polymer resin) having a particle diameter of about 2 mm. While it was stirred at a speed of about 20 kg/hr, copper particles were deposited using electro plasma on the surface of the polypropylene (PP) resin pellets with a power of about 70 kW under a vacuum of about $10^{-7}$ Torr to prepare a masterbatch having a diameter of about 2 mm.

The above masterbatch and polypropylene (PP) resin pellets having a particle diameter of about 2 mm, as a second polymer resin, were mixed at room temperature for about 2 hours to obtain a mixture.

The mixture was melted and spun at a temperature of about 180° C. through a melt-blown nonwoven fabric manufacturing facility in the Korea Institute of Industrial Technology to obtain an antimicrobial fiber, which was used to prepare an antimicrobial filter (antimicrobial dust-collecting filter).

The content of the total copper particles and the content of the active copper particles contained in the final antimicrobial filter and the absolute value of a deviation in the contents are shown in Table 2 below.

Comparative Example 3

An antimicrobial filter was prepared in the same manner as in Comparative Example 2, except that the content of the total copper particles and the content of the active copper particles contained in the final antimicrobial filter and the absolute value of a deviation in the contents were changed as shown in Table 2.

TEST EXAMPLE

Test Example 1: Analysis of the Content of Total Copper Particles and the Content of Active Copper Particles The content of total copper particles ($Cu_T$) contained in each of the antimicrobial filters of the Examples and Comparative Examples and the content of active copper particles bound to the fiber surface ($Cu_A$) were measured using an inductively coupled plasma (ICP) analyzer.

Specifically, the content of total copper particles contained in the antimicrobial filter ($Cu_T$) was measured by putting 0.1 g of the antimicrobial filter in 1.5 ml of a mixed solution of $HNO_3$ and $H_2O_2$ and pre-treating it with a microwave at 2,450 MHz at 200° C. for 20 minutes.

In addition, the content of active copper particles bound to the fiber surface ($Cu_A$) was measured by putting 0.1 g of the antimicrobial filter in 9.0 ml of $HNO_3$ and treating it with acid at 25° C. for 720 minutes.

In addition, the content ratio ($Cu_{AR}$) of the active copper particles was calculated by the following Equation 1.

$$Cu_{AR}(\%) = \frac{Cu_A}{Cu_T} \times 100 \qquad \text{[Equation 1]}$$

In Equation 1, $Cu_T$ and $Cu_A$ are each the content (ppm) of copper particles measured using an inductively coupled plasma (ICP) analyzer, wherein $Cu_T$ is the content of total copper particles contained in an antimicrobial filter measured by putting 0.1 g of the antimicrobial filter in a mixed solution of $HNO_3$ and $H_2O_2$ and pre-treating it with a microwave at 2,450 MHz at 200° C. for 20 minutes, and $Cu_A$ is the content of active copper particles measured by putting 0.1 g of the antimicrobial filter in an $HNO_3$ solution and treating it with acid at 25° C. for 720 minutes.

Test Example 2: Deviation in the Content of Active Copper Particles ($Cu_A$)

The deviation in the content of active copper particles ($Cu_A$) bound to the fiber surface was calculated from the content of active copper particles ($Cu_A$) measured by putting 0.1 g of an antimicrobial filter sample collected from an arbitrary part of the antimicrobial filter in an $HNO_3$ solution and treating it with acid at 25° C. for 720 minutes for analysis with an inductively coupled plasma (ICP) analyzer.

Test Example 3: Particle Diameter and SPAN Value

1) The average particle diameter ($F_{D50}$) of the fibers was measured using a scanning electron microscope (SEM).
2) The average particle diameter ($AP_{D50}$) of the antimicrobial particles was measured using a micro particle size analyzer (Malvern Instruments Ltd.) equipment. The average particle diameter (D50) refers to a cumulative average particle diameter (D50) corresponding to 50% by volume in a cumulative distribution curve of particle size in which the total volume is 100% in the measurement of particle size distribution by laser diffraction.

3) In the measurement of particle size distribution by laser diffraction, the average particle diameter (D10) corresponding to 10% of the cumulative volume, the average particle diameter (D50) corresponding to 50 of the cumulative volume, and the average particle diameter (D90) corresponding to 90% of the cumulative volume were measured, which were used to obtain the SPAN value represented by the following Equation 3.

$$SPAN = \frac{AP_{D90} - AP_{D10}}{AP_{D50}}$$ [Equation 3]

In Equation 3, $AP_{D10}$, $AP_{D50}$, and $AP_{D90}$ are each the average particle diameter of the antimicrobial particles that is 10%, 50%, and 90% of the cumulative volume (%) in a particle size distribution measured by the laser diffraction method.

4) The average particle diameter (D50) of the copper particles bound to the support and the average particle diameter (D50) of the support was measured using a micro particle size analyzer (Malvern instruments Ltd.) equipment. The average particle diameter (D50) refers to a cumulative average particle diameter (D50) corresponding to 50% by volume in a cumulative distribution curve of particle size in which the total volume is 100% in the measurement of particle size distribution by laser diffraction.

5) The average particle diameter (D50) of the zinc oxide particles was measured using a micro particle size analyzer (Malvern instruments Ltd.) equipment. The average particle diameter (D50) refers to a cumulative average particle diameter (D50) corresponding to 50% by volume in a cumulative distribution curve of particle size in which the total volume is 100%.

Test Example 4: Scanning Electron Microscopy (SEM)

The surfaces of each antimicrobial filter of the Examples and Comparative Examples were analyzed with a scanning electron microscope (SEM). The results are shown in FIG. 6.

Figure 6:
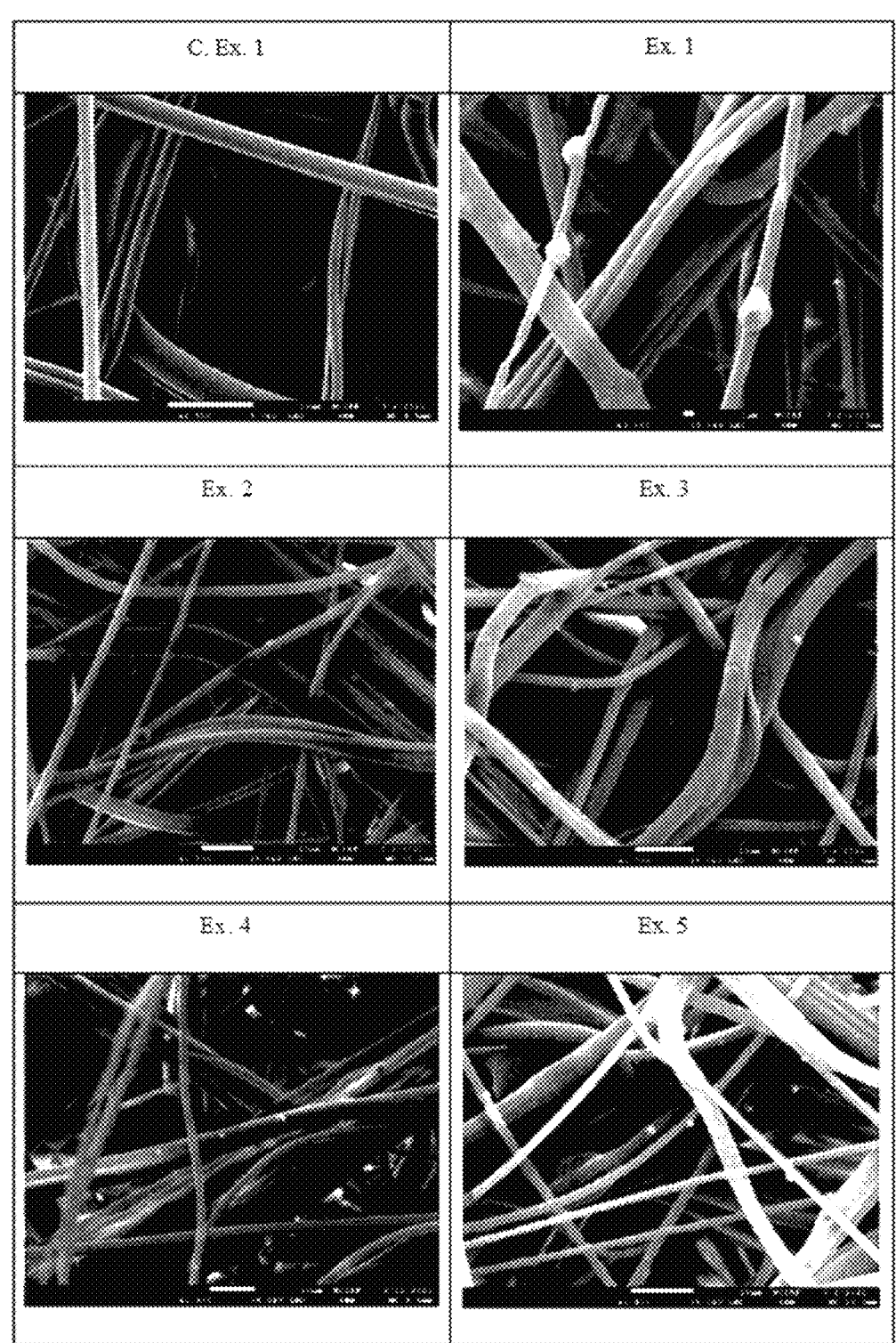
FIG. 6 shows the results of electron microscope images of the antimicrobial filters of Examples 1 to 5 and Comparative Example 1.

FIG. 6 shows photographs of the surfaces of the antimicrobial filters of Comparative Example 1 and Examples 1 to 5 observed at 5,000 magnification and 15,000 magnification, respectively.

Test Example 5: Release Amount of Copper

The antimicrobial filters of the Examples and Comparative Examples were each measured for the release amount of copper by the method specified in Notice No. 2019-70 of the National Institute of Environmental Research.

Specifically, the antimicrobial filters of the Examples and Comparative Examples were each made to a sample with a width of 30 cm and a length of 30 cm, which was mounted on a measuring device. It was then subjected to continuous operation for 96 hours at an operational flow rate of 10 m³/minute under the conditions of a temperature of 20±5° C. and a humidity of 65±10%, and the release amount (ΔCR) of copper was calculated according to the following Equation 4. Here, three samples of the antimicrobial filter are each subjected to the test for measuring the release amount, and an average value is calculated from the measured release amounts of copper. The release amount of copper was derived based on the antimicrobial dust-collecting filter (748 mm (width)×589 mm (length)×20 mm (thickness)) prepared in the Examples from the average release amount of copper measured for the sample.

$$\Delta CR = C_0 - C_1$$ [Equation 4]

In Equation 4, $C_0$ is the initial content (mg) of copper in the sample, and $C_1$ is the content (mg) of copper remaining in the filter sample after continuous operation for 96 hours at an operational flow rate of 10 m³/minute under the conditions of a temperature of 20±5° C. and a humidity of 65±10%.

Test Example 6: Antimicrobial Property

The antimicrobial filters of the Examples and Comparative Examples were each subjected to a test for antimicrobial properties according to the method specified in KS K 0693-2001. The strain, medium, and reagent used are as follows.

1. Strain used: *E. coli* (*Escherichia coli* NBRC 3301)
2. Medium and reagent

Nutrient Medium 5 g of peptone (BACTO-Peptone Ehsms Thiotone) and 3 g of beef extract were dissolved in 1,000 ml of distilled water, its pH was adjusted to 6.8±0.2)(25° C. with 0.1 M NaOH, and it was sterilized in an autoclave at a vapor pressure of 1,055 g/cm² and a temperature of 120±2° C. for 20 minutes.

Physiological Saline 5 g of NaCl was dissolved in 1,000 ml of distilled water, and it was sterilized in an autoclave at a vapor pressure of 1,055 g/cm² and a temperature of 120±2° C. for 20 minutes.

Neutralization Solution 5 g of NaCl and 2 g of a surfactant (Tween 80) were dissolved in 1,000 ml of distilled water, and it was sterilized in an autoclave at a vapor pressure of 1,055 g/cm² and a temperature of 120±2° C.' for 20 minutes.

First, 20 ml of the nutrient medium was charged into an Erlenmeyer flask, and the strain was inoculated. It was then incubated at 37±1° C. for 20 hours. The number of viable bacteria in the incubated bacterial solution was calculated by measuring the O.D. (optical density) value at 660 nm using an absorbance photometer. This was diluted with a nutrient medium such that the initial number of bacteria was adjusted to $3.0 \times 10^4$, 0.2 ml of which was used as an inoculum.

Thereafter, 0.4 g of the antimicrobial filters of the Examples and Comparative Examples were each sampled. In such an event, Comparative Example 1 in which copper particles were not deposited was used as a control.

The samples of the antimicrobial filters of the Examples and Comparative Examples were each placed in a 30-ml glass container with a lid, the inoculum was evenly sprayed to the sample, it was then incubated for 18 hours at 28±2° C., the number of bacteria was measured, and the bacteria reduction rate (BR, %) was determined according to the following Equation 5.

$$BR(\%) = \frac{BT1 - BT2}{BT1} \times 100$$ [Equation 5]

In Equation 5, BT1 is the number of bacteria after incubating the bacteria on a polypropylene melt-blown nonwoven fabric containing no copper particles at 28±2° C.

for 18 hours, and BT2 is the number of bacteria after incubating the bacteria with the antimicrobial filter under the same conditions.

The particle diameter of the copper particles contained in the antimicrobial filters of Examples 3 to 5 are shown in Table 1 below

TABLE 1

| Laser diffraction | D10 | D50 | D90 | Dmax |
|---|---|---|---|---|
| Copper particles (μm) | 1.6 | 2.8 | 4.7 | 8 |
| SPAN | | 1.1 | | |

TABLE 2

| Weight basis | Ex. 1 | Ex. 2 | Ex. 3 | Ex. 4 | Ex. 5 | C. Ex. 1 | C. Ex. 2 | C. Ex. 3 |
|---|---|---|---|---|---|---|---|---|
| Amount of copper particles or copper and zinc particles (% by weight) | Deposition of Cu on CaCO₃ (0.06%) | Deposition of Cu on CaCO₃ (0.1%) | Cu particles (1%) | Cu particles (3%) | Cu particles (1%) and ZnO particles (0.6%) | 0% | Deposition of Cu on PP (0.0276%) | Deposition of Cu on PP (0.046%) |
| Content of total copper particles (Cu$_T$) in the antimicrobial filter (ppm) | 541.4 | 977.2 | 9,836.0 | 33,703.5 | 10,637.4 | N.D. | 341.9 | 605.6 |
| Content of active copper particles (Cu$_A$) in the antimicrobial filter (ppm) | 37.9 | 78.2 | 1,475.4 | 5,729.5 | 1,595.6 | N.D. | 0.3 | 1.8 |
| Cu$_{AR}$ (Cu$_A$/Cu$_T$) (%) | 7 | 8 | 15 | 17 | 15 | N.D. | 0.1 | 0.3 |
| Deviation in Cu$_A$ (ΔCu$_A$) (ppm) | 1.4 | 2.3 | 138.9 | 85.3 | 111.7 | N.D. | 4.5 | 1.0 |
| Release amount of copper (mg) | 6.8 | 7.5 | 11.6 | 17.4 | 12.5 | N.D. | 2.1 | 2.8 |
| Antimicrobial (Bacteria reduction rate (%)) | 90 | 90 | 99 | 99.9 | 99 | 0 | 30 | 40 |

As can be seen from Table 2, in the antimicrobial filters of Examples 1 to 5, the content of active copper particles bound to the fiber surface was significantly increased as compared with the antimicrobial filters of Comparative Examples 1 to 3.

In particular, in the antimicrobial filters of Examples 1 and 2, which comprised antimicrobial particles obtained by depositing the copper particles on a support, although micro-sized copper particles were used, the content of active copper particles and antimicrobial properties were remarkably increased as compared with the antimicrobial filters of Comparative Examples 2 and 3.

Meanwhile, in the antimicrobial filters of Examples 3 to 5, in which micro-sized copper particles were used, the content of active copper particles was significantly increased, and the bacteria reduction rate was very excellent at 99% or more.

In addition, as a result of observing the surfaces of the antimicrobial filters of Comparative Example 1 and Examples 1 to 5 by scanning electron microscope (SEM)

analysis, the active copper particles bound to the fiber surface were evenly distributed in the antimicrobial filters of Examples 1 to 5.

EXPLANATION OF REFERENCE NUMERALS

10: antimicrobial particles
11: support
12: copper particles
15: copper plate
16: stirrer

The invention claimed is:

1. An antimicrobial filter, which comprises a fiber formed from a polymer resin and antimicrobial particles, wherein the antimicrobial particles comprise spherical copper particles or copper particles deposited on a support, the spherical copper particles or copper particles deposited on a support comprise active copper particles bound to the fiber surface and inactive copper particles partially or entirely embedded in the fiber, and the content ratio (Cu$_{AR}$) of the active copper particles represented by the following Equation 1 is 5 to 20%:

$$Cu_{AR}(\%) = \frac{Cu_A}{Cu_T} \times 100. \qquad \text{Equation 1}$$

in Equation 1, Cu$_T$ and Cu$_A$ are each the content (ppm) of copper particles measured using an inductively coupled plasma (ICP) analyzer, wherein Cu$_T$ is the content of total copper particles contained in an antimicrobial filter measured by putting 0.1 g of the antimicrobial filter in a mixed solution of HNO₃ and H₂O₂ and pre-treating it with a microwave at 2,450 MHz at 200° C. for 20 minutes, and

25

$Cu_A$ is the content of active copper particles measured by putting 0.1 g of the antimicrobial filter in an $HNO_3$ solution and treating it with acid at 25° C. for 720 minutes.

2. The antimicrobial filter of claim 1, wherein $Cu_T$ is 350 to 50,000 ppm by weight, $Cu_A$ is 15 to 10,000 ppm by weight, and the absolute value of a deviation in $Cu_A$ is 150 ppm or less.

3. The antimicrobial filter of claim 1, wherein the antimicrobial filter has a ratio ($AP_{DR}$ (%)) of the average particle diameter of the antimicrobial particles to the average particle diameter of the fiber of 70 to 150% as represented by the following Equation 2:

$$AP_{DR}(\%) = \frac{AP_{D50}}{F_{D50}} \times 100. \qquad \text{Equation 2}$$

in Equation 2, $F_{D50}$ is the average particle diameter (D50) of the fiber measured using a scanning electron microscope (SEM), and $AP_{D50}$ is the average particle diameter (D50) of the antimicrobial particles that is 50% of the cumulative volume (%) in a particle size distribution measured by the laser diffraction method.

4. The antimicrobial filter of claim 3, wherein $F_{D50}$ is 1 to 10 μm, $AP_{D50}$ is 1 to 8 μm, and the absolute value of a deviation in the diameter of the antimicrobial particles is 1 to 3 μm.

5. The antimicrobial filter of claim 1, wherein the antimicrobial particles have an SPAN value of 0.8 to 2 as represented by the following Equation 3:

$$SPAN = \frac{AP_{D90} - AP_{Motojima0}}{AP_{D50}}. \qquad \text{Equation 3}$$

in Equation 3, $AP_{Motojima0}$, $AP_{D50}$, and $AP_{D90}$ are each the average particle diameter of the antimicrobial particles that is 10%, 50%, and 90% of the cumulative volume (%) in a particle size distribution measured by the laser diffraction method.

6. An antimicrobial filter, which comprises a fiber formed from a polymer resin and antimicrobial particles, wherein the antimicrobial particles comprise copper particles or copper particles deposited on a support, the copper particles comprise active copper particles bound to the fiber surface and inactive copper particles partially or entirely embedded in the fiber, and the content ratio ($Cu_{AR}$) of the active copper particles represented by the following Equation 1 is 5 to 20%:

$$Cu_{AR}(\%) = \frac{Cu_A}{Cu_T} \times 100. \qquad \text{Equation 1}$$

in Equation 1, $Cu_T$ and $Cu_A$ are each the content (ppm) of copper particles measured using an inductively coupled plasma (ICP) analyzer, wherein $Cu_T$ is the content of total copper particles contained in an antimicrobial filter measured by putting 0.1 g of the antimicrobial filter in a mixed solution of $HNO_3$ and $H_2O_2$ and pre-treating it with a microwave at 2,450 MHz at 200° C. for 20 minutes, and

26

$Cu_A$ is the content of active copper particles measured by putting 0.1 g of the antimicrobial filter in an HNO; solution and treating it with acid at 25° C. for 720 minutes wherein the copper particles deposited on a support have an average particle diameter (D50) of 1 to 10 nm, the support comprises at least one selected from calcium carbonate and quartz, and the support has an average particle diameter (D50) of 1 to 5 μm.

7. The antimicrobial filter of claim 1, wherein the antimicrobial particles comprise the copper particles and zinc oxide particles, the zinc oxide particles have an average particle diameter (D50) of 0.2 to 2 μm, and the weight ratio of the copper particles and the zinc oxide particles is 1:0.5 to 2.

8. The antimicrobial filter of claim 1, wherein the polymer resin comprises a polypropylene resin, and the polymer resin has a melt flow index (MI) of 220 to 1,100.

9. The antimicrobial filter of claim 1, wherein, when the antimicrobial filter is sampled at a size of 30 cm in width and 30 cm in length and measured by the method prescribed in Notice No. 2019-70 of the National Institute of Environmental Research, the release amount of copper after 96 hours at an operating flow rate of 10 m³/minute at a temperature of 20±5° C. and a humidity of 65±10% is 70 mg or less.

10. A process for preparing an antimicrobial filter, which comprises:

a first step of mixing and extruding antimicrobial particles and a first polymer resin to obtain a first masterbatch;

a second step of mixing the first masterbatch with second polymer resin pellets to obtain a mixture; and a third step of melt-spinning the mixture, wherein the antimicrobial filter comprises a fiber formed from a polymer resin and antimicrobial particles, the antimicrobial particles comprise spherical copper particles or copper particles deposited on a support, the spherical copper particles or copper particles deposited on a support comprise active copper particles bound to the fiber surface and inactive copper particles partially or entirely embedded in the fiber, and the content ratio ($Cu_{AR}$) of the active copper particles represented by the above Equation 1 is 5 to 20%:

$$Cu_{AR}(\%) = \frac{Cu_A}{Cu_T} \times 100. \qquad \text{Equation 1}$$

in Equation 1, $Cu_T$ and $Cu_A$ are each the content (ppm) of copper particles measured using an inductively coupled plasma (ICP) analyzer, $Cu_T$ is the content of total copper particles contained in an antimicrobial filter measured by putting 0.1 g of the antimicrobial filter in a mixed solution of $HNO_3$ and $H_2O_2$ and pre-treating it with a microwave at 2,450 MHz at 200° C. for 20 minutes, and $Cu_A$ is the content of active copper particles measured by putting 0.1 g of the antimicrobial filter in an $HNO_3$ solution and treating it with acid at 25° C. for 720 minutes.

11. The process for preparing an antimicrobial filter of claim 10, wherein the mixing in the first step is carried out by mixing the first polymer resin and the antimicrobial particles at a weight ratio of 1:0.15 to 0.5 and stirring them at room temperature for 1 to 4 hours, and the mixing in the second step is carried out by mixing the second polymer resin pellets and the first masterbatch at a weight ratio of 1:0.01 to 0.3 and stirring them at room temperature for 1 to 10 hours.

12. An air purifier, which comprises the antimicrobial filter of claim 1.

5

\* \* \* \* \*